(12) United States Patent
Carpentier et al.

(10) Patent No.: US 8,762,353 B2
(45) Date of Patent: Jun. 24, 2014

(54) ELIMINATION OF DUPLICATE OBJECTS IN STORAGE CLUSTERS

(75) Inventors: Paul R. M. Carpentier, Boechout (BE); Russell Turpin, Corpus Christi, TX (US)

(73) Assignee: Caringo, Inc., Austin, TX (US)

( * ) Notice: Subject to any disclaimer, the term of this patent is extended or adjusted under 35 U.S.C. 154(b) by 18 days.

(21) Appl. No.: 13/517,525

(22) Filed: Jun. 13, 2012

(65) Prior Publication Data

US 2013/0339314 A1 Dec. 19, 2013

(51) Int. Cl.
*G06F 17/30* (2006.01)
(52) U.S. Cl.
USPC .......................................... 707/698
(58) Field of Classification Search
CPC .......... G06F 17/3015; G06F 17/30153; G06F 17/30156
See application file for complete search history.

(56) References Cited

U.S. PATENT DOCUMENTS

| | | | |
|---|---|---|---|
| 5,978,791 A | 11/1999 | Farber et al. ................... 707/640 |
| 6,415,280 B1 | 7/2002 | Farber et al. ................... 707/698 |
| 6,928,442 B2 | 8/2005 | Farber et al. ............... 707/999.1 |
| 7,373,345 B2 | 5/2008 | Carpentier et al. |
| 7,734,603 B1 | 6/2010 | McManis |
| 7,802,310 B2 | 9/2010 | Farber et al. ..................... 726/28 |
| 7,945,539 B2 | 5/2011 | Farber et al. ................... 707/689 |
| 7,945,544 B2 | 5/2011 | Farber et al. ................... 707/698 |
| 7,949,662 B2 | 5/2011 | Farber et al. ................... 707/747 |
| 8,001,096 B2 | 8/2011 | Farber et al. ................... 707/698 |
| 2003/0135700 A1 | 7/2003 | Schultz et al. |
| 2008/0247355 A1 | 10/2008 | Ahn |
| 2009/0228511 A1 | 9/2009 | Atkin et al. |

OTHER PUBLICATIONS

International Search Report in PCT/US2013/44042 mailed Aug. 30, 2013.
Written Opinion in PCT/US2013/44042 mailed Aug. 30, 2013.

*Primary Examiner* — Wilson Lee
(74) *Attorney, Agent, or Firm* — Beyer Law Group LLP

(57) ABSTRACT

Digital objects within a fixed-content storage cluster use a page mapping table and a hash-to-UID table to store a representation of each object. For each object stored within the cluster, a record in the hash-to-UID table stores the object's hash value and its unique identifier (or portions thereof). To detect a duplicate of an object, a portion of its hash value is used as a key into the page mapping table. The page mapping table indicates a node holding a hash-to-UID table indicating currently stored objects in a particular page range. Finding the same hash value but with a different unique identifier in the table indicates that a duplicate of an object exists. Portions of the hash value and unique identifier may be used in the hash-to-UID table. Unneeded duplicate objects are deleted by copying their metadata to a manifest and then redirecting their unique identifiers to point at the manifest.

13 Claims, 10 Drawing Sheets

|  822 | 824 |
|------|-----|
| 3674 | 10  |
| 3687 | 10  |
| 8712 | 20  |
| ...  | ... |
| 5987 | 50  |
| 5431 | 50  |

810

Disk-to-Node Mapping Table

| 872 | 874 | 876 | 878 | 880 |
|-----|-----|-----|-----|-----|
| Node ID | % Busy | % Full | Drive Type | Other |
| 10 | 84 | 92 | active | |
| 20 | 63 | 55 | archival | |
| 30 | 22 | 17 | active | |
| ... | — | — | — | — |

Node Status Table

FIG. 9

ELIMINATION OF DUPLICATE OBJECTS IN STORAGE CLUSTERS

CROSS-REFERENCE TO RELATED APPLICATIONS

This application is related to U.S. patent application Ser. No. 14/200,183 filed on the same date herewith, entitled "Two Level Addressing in Storage Clusters" and to U.S. patent application Ser. No. 13/517,527 filed on the same date herewith, entitled "Erasure Coding and Replication in Storage Clusters," both of which are hereby incorporated by reference.

FIELD OF THE INVENTION

The present invention relates generally to data storage and retrieval. More specifically, the present invention relates to elimination of duplicate digital objects in a fixed-content storage cluster.

BACKGROUND OF THE INVENTION

Historically, computer files (or more generally, digital objects) have been stored in file systems. These file systems have typically been hierarchical, and have allowed files to be inserted, removed or retrieved according to a particular schema. Usually, such a file system is implemented using a B-tree and objects are stored along with metadata such as a file name and other attributes. The file identifier often conforms to a regular hierarchical path and files are stored and retrieved using path names.

This model of storing files, though, is reaching its limits as massive amounts of information are now being required to be stored within file systems. A single computer may store millions of files and computer servers in large networks may be required to store many times that amount of information. While a B-tree implementation (for example) may work fine with many thousands of files, a file system may process requests much more slowly as the number of files increase. New techniques of storing information have accordingly been developed.

Storage clusters have been developed where digital objects are stored in a flat address space across any number of computer nodes. A unique identifier for each object (such as a hash value taken over the object or a random number, for example) is used to add the digital object to, or retrieve it from, the storage cluster. With the proliferation of electronic mail, information being available in electronic form, mobile telephones, etc., greater quantities of digital information are being stored and inevitably, the same digital object may be stored many times in a computer system. For example, a single presentation sent around a corporate environment may be stored many hundreds of times on an e-mail server or within a long-term storage cluster, even though each copy of the presentation is exactly the same. Having multiple copies of the same digital object within a storage cluster wastes disk space, consumes CPU time, and generally makes the cluster less efficient. It would be advantageous to eliminate the unneeded copies.

If a hash value of the digital object is used as the unique identifier, then this hash value may be sent to the cluster before the digital object is stored in order to determine if the object is already present within the cluster. But, this technique ("in-line elimination of duplicates") can bog down the input rate to the cluster as the hash value must be calculated using the entire object before the hash value can be sent. If an identifier other than a hash value is used (such as a random number) then in-line elimination would not be an option because there would not be a one-to-one correspondence between the identifier and the object (copies of the object may have different identifiers).

Accordingly, it would be desirable to eliminate duplicates of digital objects within a storage cluster regardless of the type of unique identifier used, and without bogging down the input rate to the cluster.

SUMMARY OF THE INVENTION

To achieve the foregoing, and in accordance with the purpose of the present invention, a technique is described that eliminates unneeded duplicates in a storage cluster.

The technique first detects all duplicates and then eliminates any unneeded duplicates while retaining the unique identifiers referring to the original duplicates. Thus, the unique identifiers originally generated for the duplicates are still valid. During the detection phase, object metadata may be used to indicate that a particular digital stream need not be reviewed for possible elimination because the type of object indicates that it will most always be unique (e.g., in the case of medical imaging), or because the object is small enough (e.g., on the order of 10 k bytes in size).

In a first embodiment, a method detects duplicates within a storage cluster. A hash value of a digital object and a unique identifier for that object are obtained. Each may be shortened to a portion of the entire length. A portion of the hash value is used as an index into a page mapping table to identify a computer node of the cluster which contains the relevant hash-to-UID table. This table is accessed to determine whether the hash value is represented in table. If so, the unique identifier of the table (or portion thereof) is compared to the unique identifier of the object. A match indicates that no duplicates exist, while differing unique identifiers indicates that a duplicate likely exists. A second digital object identified by the unique identifier of the table is accessed and the hash value of the second digital object is compared to the obtained hash value. Matching hash values confirm that a duplicate exists.

In a second embodiment, a method deletes a duplicate (or duplicates) of a digital object within the cluster. First and second unique identifiers are received that identify two digital objects within the cluster that are duplicates of one another. The metadata associated with the second object to be deleted is stored in a metadata storage location along with metadata from the first object. A pointer in the metadata location is created to identify the location of the first object. The second object may then be deleted and the second unique identifier is redirected to point at the metadata storage location.

In a third embodiment, a method stores a record of an object stored within the cluster for future use in detecting duplicates. A computer node within the cluster calculates a hash value for the digital object and stores the object on disk. A unique identifier for the object is also generated. A portion of the hash value representing a unique range of addresses is identified and used to access a page mapping table to identify a particular computer node within the cluster. This particular computer node holds a hash-to-UID table corresponding to the portion of the hash value. The hash value and unique identifier are sent to this particular computer node and at least a first part of the hash value and at least a first part of the unique identifier are stored in a record in this table to indicate that the object is present within the cluster. Future duplicates of this object that are stored within the table will have the same hash values but different unique identifiers. Preferably, a hash function is applied to the data of the object, not including any metadata, to generate the hash value.

BRIEF DESCRIPTION OF THE DRAWINGS

The invention, together with further advantages thereof, may best be understood by reference to the following description taken in conjunction with the accompanying drawings in which:

FIG. 8 illustrates a suitable disk-to-node mapping table.

FIG. 9 shows a node status table that may be used.

DETAILED DESCRIPTION OF THE INVENTION

Figure 1:
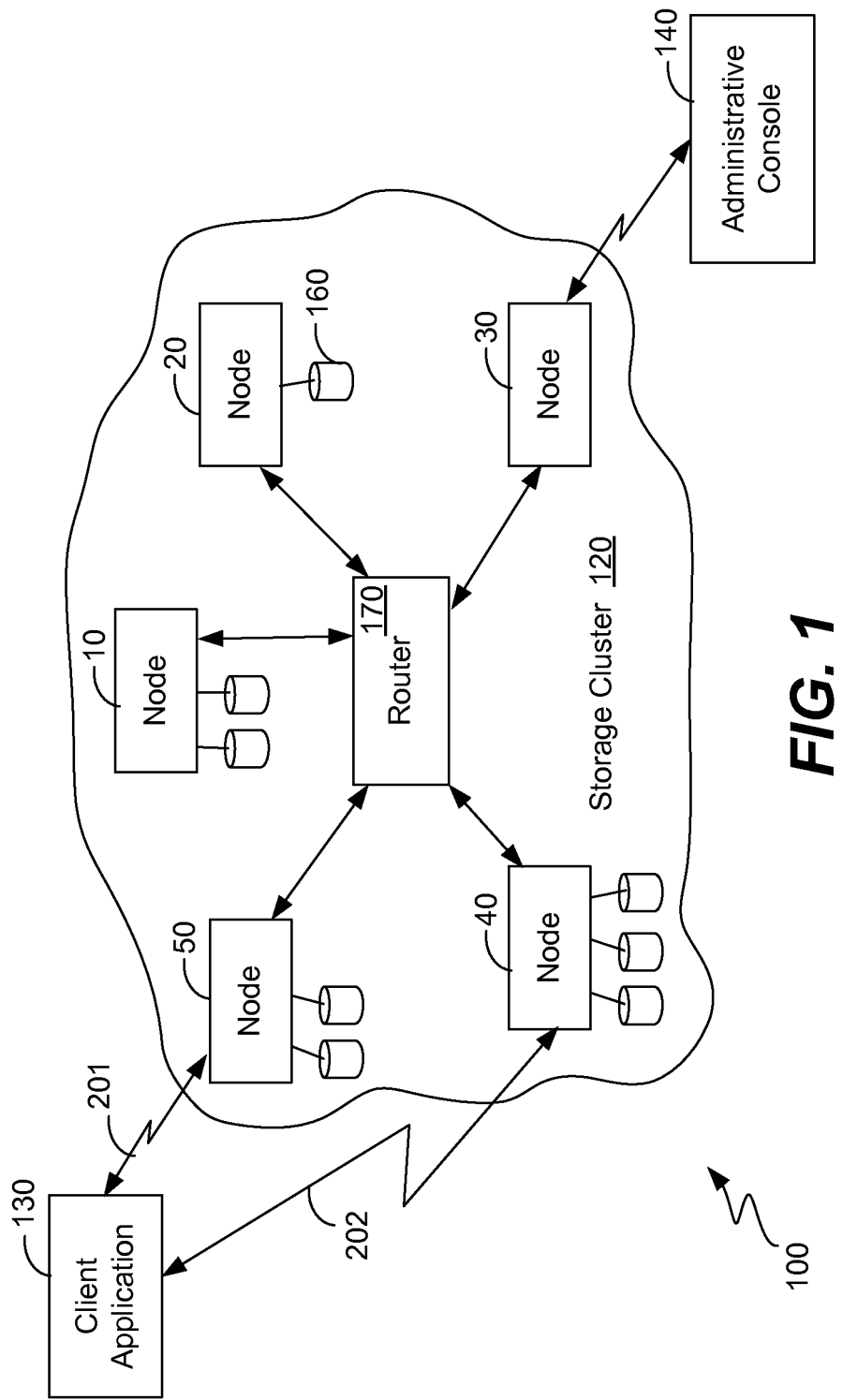
FIG. 1 illustrates an environment for operation of the present invention.

As mentioned above, improvements are desired in the deletion of duplicate objects within a storage cluster. It is realized that many of the data structures and techniques used in the above-mentioned application "Two Level Addressing in Storage Clusters" may also be used in the present invention to detect duplicate objects. More specifically, a hash value to unique identifier table (hash-to-UID table) may be used to keep track of all of the pairs of a hash value and the corresponding unique identifier for all digital objects within the cluster. While this table may potentially be extremely long, it can be distributed amongst the nodes of the storage cluster in the same way that the pages index is distributed in the above-mentioned application. Similarly, a page mapping table (the exact same page mapping table or a similar one) may also be used to map pages of a hash value to the particular node where the hash-to-UID table is located corresponding to that page of the hash value. In sum, while the above-mentioned application uses a key of the unique identifier as an index into the page mapping table, which in turn provides the node where the pages index is located, the present invention uses a key of the hash value of an object as an index into the page mapping table, which in turn provides the node where the hash-to-UID table is located. If duplicate objects are detected the unneeded duplicates are deleted, yet the unique identifiers for the deleted objects will still refer to the remaining copy of the object.

Storage Cluster Example

As mentioned above, the present invention applies to digital objects, i.e., any type of information represented in digital form. For instance, a digital object may be an electronic representation of information such as a computer file, a group of files, a group of file identifiers, or the collections of data or database information. Such other collections of data include frames or clips from digital audio or video streams, digital photographs, scanned paper documents, voice messages, CAD/CAM designs, MRI or X-ray data, streams from message records or files, log entries from audits or status logs of systems, e-mail archives, check images, etc. The term "computer file" is often used herein to encompass any electronic representation of information.

The present invention may be implemented using any suitable computer hardware and software, and may be implemented upon a storage cluster that includes any number of computer nodes. Preferably, each node includes a CPU (or multiple CPUs), an operating system, communication links to the other nodes (or, to at least a central router), and any number of hard disk or solid-state drives (i.e., from zero to N) or other persistent data storage devices. Typically, each node includes at least one drive and there may be any combination of hard disk drives along with solid-state drives. A storage cluster is typically a fixed-content cluster, often referred to as WORM (write once, read many) storage, meaning that once a computer file or digital object is written to the cluster it cannot be changed. (Of course, the file may be deleted and a modified version of the computer file may also be stored within the cluster.) A cluster may be implemented as a redundant array of independent nodes (a RAIN) meaning that each node runs its own operating system and makes independent decisions about storage within the cluster. Storage clusters may be built upon blades, towers, personal computers and servers. Alternatively, a multi-core processor within a single computer box may support a virtual storage node running on each core, meaning that a storage cluster having multiple nodes may be present within the single computer box. Further, a computer system inside a single physical box may include multiple CPUs in which case each CPU may represent a node and the storage cluster may be implemented within the single physical box.

FIG. 1 illustrates an environment 100 for operation of the present invention. Included is a storage cluster 120, a client application 130, an administrative console 140, any number of computer nodes 10-50, and a central router 170. As mentioned above, a computer node is typically a physical file server that preferably includes at least one CPU and any number of disk drives 160, solid-state drives or hybrid drives that have both types. Each node implements an operating system such as Debian Linux and executes processes to manage peer-to-peer communications between nodes, to perform health processing, and to make independent decisions on behalf of the node and its volumes. Each node also includes administrative software and its status can be viewed via a web browser over the Internet.

In one particular RAIN embodiment, each node is a 1U server (e.g., an x86 computer) with 1 terabyte or more of serial ATA disk storage capacity with standard Ethernet networking. Each node has an IP address and may be physically interconnected using an IP-based LAN, MAN or WAN. Thus, each node may talk to a single node or may broadcast a message to all nodes within the storage cluster (a multicast) using a router 170 or other similar network switch.

Each node includes a management module for handling external requests from client applications (e.g., an SCSP request from client 130), replication requests between nodes (e.g., interSCSP requests), and other internode protocol communications (bidding, requests for information, etc.). A health processing module manages the digital content of each node. The administrative console 140 is preferably a Web server linked to the storage cluster that allows access to each node over any suitable Internet connection. Each node implements a redundant administrative console which can be used to view and administer the entire cluster.

In one embodiment, a storage cluster may be implemented using content storage software available from Caringo, Inc. of Austin, Tex. (modified as described herein), and any suitable computer hardware. In this embodiment, a storage cluster implements fixed-content content-addressable storage and each digital object is uniquely addressed within the cluster by a random number (a universally unique identifier, or UUID) that has been generated for that digital object using a random number generator. The contents of each digital object may be verified using a hash function. A client software application receives the UUID when storing a digital object in the cluster and retrieves that digital object by supplying the UUID to the cluster. In another embodiment, each digital object is uniquely addressed within the cluster by a hash value (a unique identifier) that has been calculated for that digital object using a hash function. Software applications communicate with a CAStor cluster using standard HTTP 1.1, and more specifically, using a simplified subset of that standard called Simple Content Storage Protocol (SCSP). Using this standard interface, client applications such as electronic mail, enterprise content management, health care applications, Web browsers, Web 2.0 sites, photo sharing, social media sites, security video, video editing, etc., may access the CAStor storage cluster in order to store files, retrieve files or delete files. Further, direct HTPP access is available for browsers, JAVA, Python, C++, and other software environments.

In one embodiment, a digital object is stored on a particular node in the following way. Each node includes a disk index in RAM listing where a digital stream including the object is stored on disk on the node based upon its unique identifier. For example, a first column of the index lists the universally unique identifier of the object, a second column lists at which sector the stream starts and a third column lists either the length of the stream or the sector in which it ends. A stream may include the digital object as well as relevant metadata. Accordingly, objects to be stored on a node may simply be written sequentially to the disk and their locations recorded in the RAM index. Or, objects may be stored anywhere on the disk using any suitable storage algorithm and the objects' locations again will be recorded in the index. When an object is to be read or deleted, its location on the disk may be found by consulting this index. To facilitate building up this RAM index upon a restart of the node, a journal of the node stored within persistent storage records whenever an object is added or deleted and includes the unique identifier for the object, the sector at which it starts and its length in sectors or bytes. Accordingly, when the node is restarted the information in the journal is read and is used to create the disk index in RAM. Another technique to build up the index instead of using a journal is to read the entire disk upon a restart in order to gather the necessary information although this will be more time consuming.

For data redundancy, objects may be stored using replication, erasure coding, or both, as described in "Erasure Coding and Replication in Storage Clusters" referenced above.

Designated Coordinator Node

In certain embodiments, all nodes are considered equal and communicate with each other by periodically broadcasting (or multicasting) their relevant information to all other nodes within the cluster. In a preferred embodiment, at any given point in time one of the nodes is designated the coordinator node and assumes the role of gathering relevant information from all nodes and then distributing that information periodically. It is desirable that only one node at a time may be the designated coordinator node, although there may be a backup coordinator node ready to be put into service if needed, and the role of the coordinator node may be transferred from node to node periodically, such as every few minutes.

Accordingly, each node within the cluster periodically transmits to the designated coordinator node information such as: how busy the node is, how full the disks drives of that node are, the type of disk drives available, the amount and percentage of RAM available, whether the node has newly been added, the volume identifiers for the disks it includes, and any other relevant information. The designated coordinator node assembles this information from each node, creates or updates the disk-to-node mapping table 810, updates the node status table 860, updates its page mapping table, and then broadcasts this information to all nodes periodically in a single multicast message, such as every second. This process is more efficient as it uses less broadcasting (thus, fewer CPU interrupts) while relating the same information.

Page Mapping Table and Pages Index

In one embodiment, the detection and elimination of duplicate objects makes use of the page mapping table and pages index described in the application "Two Level Addressing in Storage Clusters." These techniques will be described briefly before the description of the present invention.

A particular address range of unique identifiers is allocated to a particular node, and, this node will not necessarily store the digital objects of that address range, but will know on which node the objects are stored. Thus, a page mapping table on a node points to any number of pages indexes, each pages index actually holding the information regarding on which node a particular digital object is stored. In this fashion, if nodes are deleted or added, only pointers in RAM need be moved around, not entire files on disk.

Figure 2:
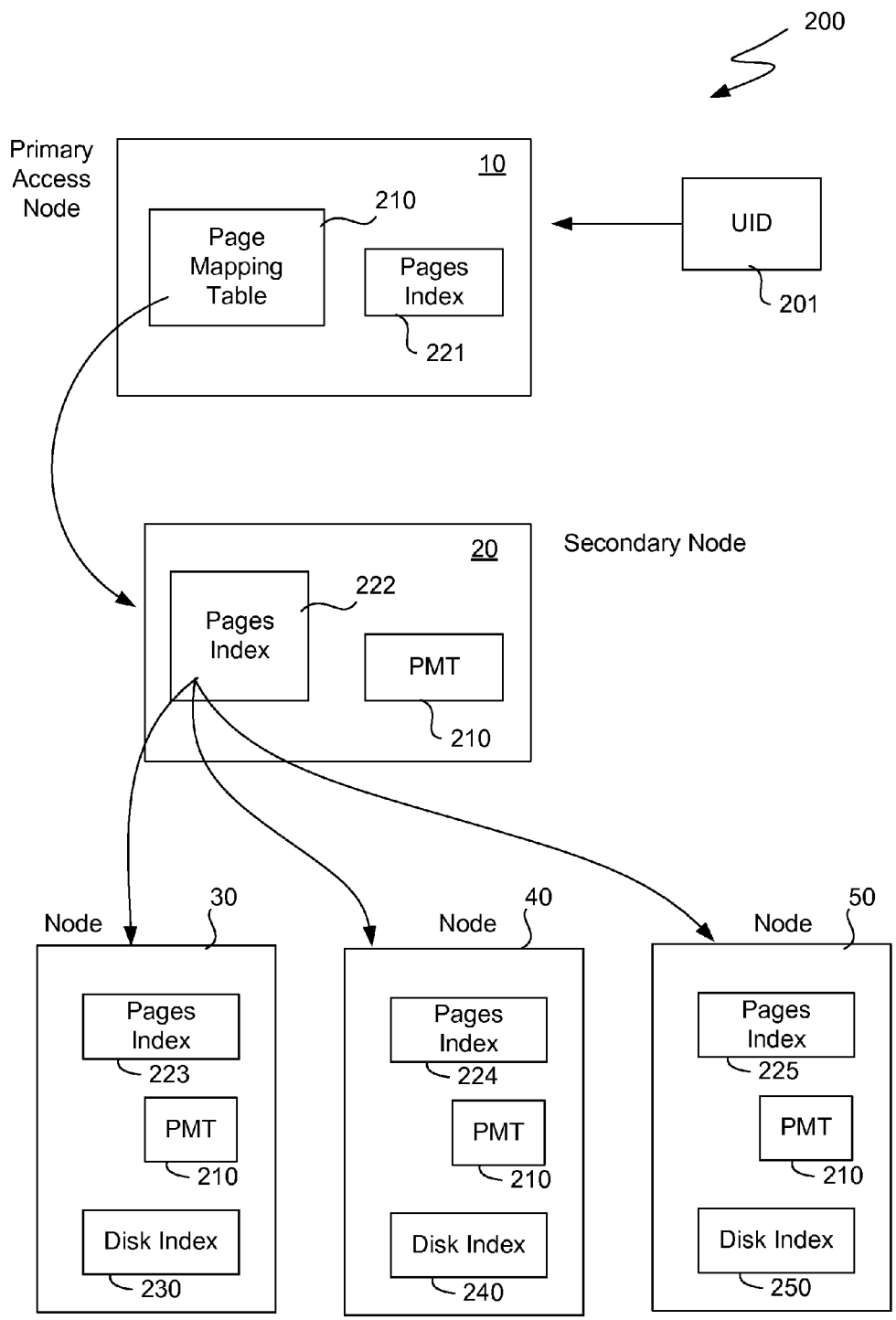
FIG. 2 is a block diagram showing computer nodes from FIG. 1.

FIG. 2 is a block diagram 200 showing computer nodes 10-50 from FIG. 1. This figure illustrates, at a high level, how the page mapping table and pages index may be used to find a particular computer file within a storage cluster. Each node includes the page mapping table 210 which is the same for each node. It is not required that the page mapping table be present on each node, but doing so increases efficiency and allows a client application to contact any node of the cluster regarding a particular digital object. Preferably, the page mapping table is distributed to all nodes periodically, especially after it is updated. Each node also includes a pages index 221-225 which will be different for each node. Also, each node includes a disk index that, given a particular unique identifier, indicates precisely where on disk the identified digital object is stored.

Essentially, searching for a file (for example) in a storage cluster identified by a particular unique identifier 201 is a three-step process. The unique identifier is first used on a primary access node 10 of the cluster to consult a page mapping table 210. The unique identifier is treated as an address, and the page mapping table maps that address to a particular secondary node, in this case, node 20. The page mapping table does not know on which node the digital object is stored based upon the address, but it does know which node will know— the secondary node. Each possible address indicated by a unique identifier is mapped to one of many secondary nodes. In other words, each pages index is responsible for a discrete address range of all the possible addresses available using the unique identifier. Thus, while a unique identifier indicating a particular address might be mapped to pages index 222 on node 20, a different unique identifier indicating a different address (in a different address range) might very well be mapped to a different pages index 223 on node 30, etc. There is no requirement that each node within the cluster hold one of the pages indexes, but it is preferable. In fact, each node may be responsible for more than one address range.

The secondary node 20 does not necessarily hold the digital object identified by the unique identifier, but will know which node does hold the digital object. Using the unique identifier (or a partial identifier) on the secondary node 20, the pages index 222 is consulted in order to determine which node likely does hold the digital object identified by the unique identifier. In this example, the pages index 222 indicates that each of nodes 30, 40 and 50 does hold a copy of the digital object (possibly because an attribute of the digital object requires that three copies should be kept within the cluster). One of these final nodes 30-50 may then be accessed and the unique identifier is used in one of the disk indexes 230-250 of the final node in order to determine where the digital object is located on the disk of that node. Techniques for writing a digital object to the cluster, for deleting an object, and for dealing with situations where a node drops out or is added, also make use of the page mapping table and pages indexes.

Accordingly, no more than three nodes (or possibly more nodes in the case where partial identifiers are used) need be accessed in order to find an object. It is also possible that the pages index is located on the same node which holds the page mapping table, and that the digital object is also located upon this node. In this situation only one node need be accessed. It is also possible that more than one copy of a particular object is stored within the cluster (depending upon an attribute of the object); in this situation, the pages index would indicate the nodes holding each of those copies. In addition, if partial identifiers are used, the pages index might indicate a certain number of nodes where it is believed a copy of the digital object is stored, but not all of these nodes would actually have a copy of the object.

In one embodiment, in order to save RAM, the pages index of objects on a particular disk is not built up using the entire 128-bit identifier for each object, but uses a partial identifier (for example, the first 4 or 5 bytes of the unique identifier) in order to indicate whether or not the object is present on the node. Once it is believed that the object is found, then a final check may be made in the disk index using the full unique identifier to verify that the node is the correct one. Even though this technique may result in occasional uncertainty and a very slight decrease in performance, it provides a significant advantage in that it uses less RAM.

Figure 3:
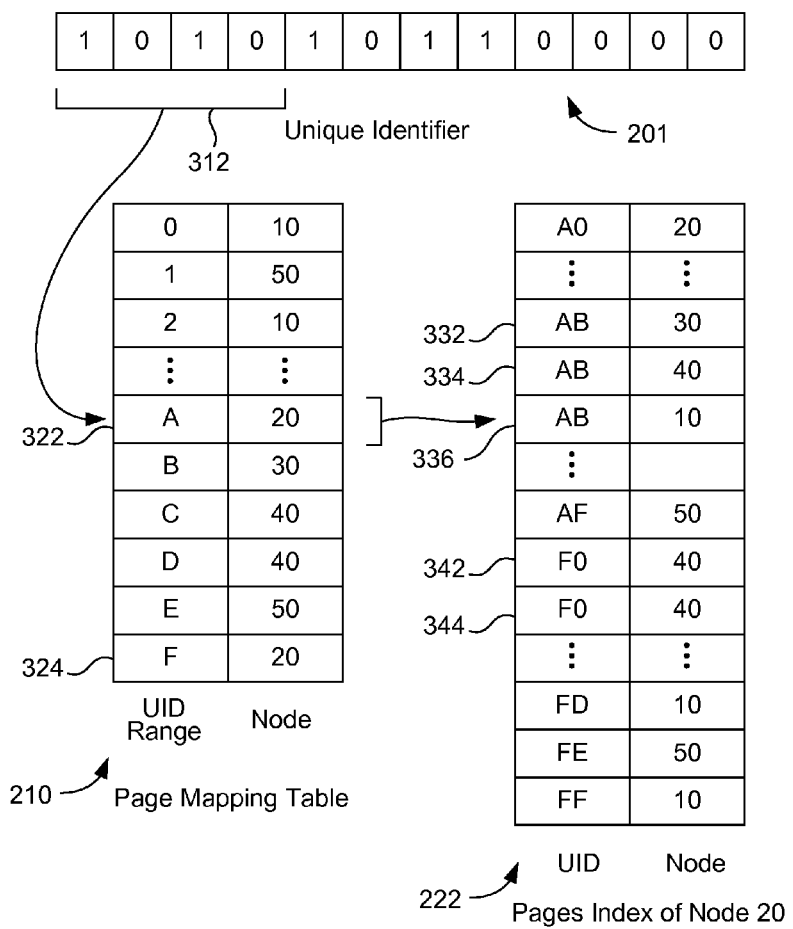
FIG. 3 illustrates a more detailed example of finding an object identified by a unique identifier.

FIG. 3 illustrates a more detailed example of finding an object identified by a unique identifier. In this example, a client application has provided a unique identifier 201 and is attempting to find the digital object corresponding to this identifier in the storage cluster. Although this example identifier is shown having only 12 bits, typically a unique identifier may have a much greater number of bits, such as 128 bits. In this example, the first four bits 312 of the identifier are used to divide up the potential address space addressed by the 12-bit identifier into 16 different address ranges, or pages. In other words, the first four bits represent a possible number from 0 up to 15, or from 0-9 and A-F in hexadecimal. Each of these hexadecimal digits then represents a possible address range that will be used as key into the page mapping table 210. Of course, fewer or greater than four bits of the unique identifier may be used as an index into the page mapping table, fewer bits resulting in a much shorter index, while a greater number of bits resulting in an exponentially larger page mapping table. Because RAM is relatively inexpensive, a greater number of bits for key 312 is likely to be used, with 32 to 48 bits being a reasonable number.

As shown, the page mapping table 210 includes a first column, UID Range, listing each hexadecimal digit that could possibly be identified by the four bits at 312. The second column of the page mapping table lists the particular node holding the pages index that indicates where the digital object represented by the unique identifier is stored. In other words, the second column does not indicate where the digital object is stored, but indicates a node that knows where the digital object is stored. As shown, because bits 312 represent the digit A, this provides an index into row 322 indicating that it is node 20 that knows where the digital objects are stored whose unique identifiers begin with the hexadecimal digit A. Note that it is possible for more than one address range to be stored on a particular node. For example, rows 322 and 324 indicate that node 20 has a pages index that stores the location of digital objects whose unique identifiers begin with A and with F. Even though the second column lists all nodes of the example cluster 120, is not required that each node keep a pages index, although that is preferable. Accordingly, the key into the page mapping table indicates that the pages index 222 of node 20 has information indicating the storage location of the digital object identified by unique identifier 201.

As shown, pages index 222 has a first column listing the unique identifiers of digital objects that begin with either A or F, and a second column indicating the nodes where these digital objects may be found. The contents of these columns may be varied depending upon implementation details. For example, it is possible that the first column will list the entire unique identifier (i.e., the entire 12 bits of this example, or the entire 128 bits in the preferred embodiment) rather than a partial unique identifier as shown. Listing the entire unique identifier will greatly increase the size of the pages index, while listing a portion (e.g., the first 48 bits, or the first 8 bits in this example) will result in a smaller index at the expense of uncertainty regarding the exact location of a digital object. This example lists the first 8 bits of possible unique identifiers. Unique identifier 201 has the hexadecimal value AB0, and rows 332-336 indicate that digital objects whose unique identifiers begin with the digits AB may be found on nodes 30, 40 and 10. In this example, three nodes are listed because it is possible that this particular digital object has a metadata requirement that three copies be kept within the cluster.

It is also possible that three nodes are listed in rows 332-336 even though the metadata requirement indicates that only a single copy be kept of each digital object. In this situation, it is possible that there are three digital objects having unique identifiers AB0, AB4 and ABE, and that these digital objects are kept on nodes 30, 40 and 10. Accordingly, rows 332-336 correctly indicate that digital objects having unique identifiers beginning with "AB" are stored on these nodes. This situation illustrates the uncertainty that is possible when partial unique identifiers are used in the first column. When searching for a particular digital object in this situation, it may be necessary to check each of nodes 30, 40 and 10 before the correct digital object is found. Even though there is some uncertainty in this embodiment when partial unique identifiers are used, the number of multiple nodes that need be checked can remain small, and the length of the pages index can be kept manageable. In addition, determining whether a particular digital object is present upon a node only involves comparing the unique identifier 201 with the disk index in RAM of each node, rather than requiring a disk access. Therefore, in a preferred embodiment, partial unique identifiers are used in the first column and a suitable length for these partial identifiers is 32 to 48 bits.

Row 342 of the pages index also shows another implementation detail. If a digital object whose unique identifier begins with the characters F0 is stored at node 40 then a row 342 will be added to the pages index as shown. And, when another object whose unique identifier also begins with the characters F0 is stored at node 40 then duplicate row 344 will also be added to the pages index even though the two rows are exactly the same. And, this will be the case even if the two rows are referring to two copies of the same digital object having the same unique identifier. In this manner, is not necessary for any node to scan its pages index when adding a new row. The new row is simply added without regard as to whether a duplicate row already exists.

Although the second column of the pages index lists the nodes upon which particular digital objects may be found, in one preferred embodiment it is not the nodes that are listed in the second column, but a unique identifier for each disk within the cluster. In other words, each row of the pages index would indicate for a particular unique identifier (or for a partial identifier) the specific disk within the cluster where the digital object is located. Once the unique identifier for the disk is found, then a disk-to-node mapping table stored in each node is then used to map that disk identifier to the actual node where the disk is located. The system may then access that node to retrieve the object or determine if the object is actually present on that disk. This embodiment is used in implementations where disks might be moved to different nodes within a cluster.

FIG. 8 illustrates a suitable disk-to-node mapping table 810. As shown, a first column 822 indicates a unique identifier for each disk within the storage cluster and a second column 824 indicates the node on which that particular disk is located. Not all of the disks and nodes are shown in this abbreviated table. If disks are added to or removed from the cluster, if disks are moved to different node, or if nodes are added to or removed from the cluster, then this mapping table will be updated and the designated coordinator node will send out an updated version of the mapping table to all nodes.

Page Mapping Table and Hash-to-UID Tables

It is realized that a novel technique for detecting and deleting duplicate digital objects from a storage cluster should be fast, should avoid interrupting nodes and causing disk accesses when possible, should allow addition and deletion of nodes without massive redistribution of data, and should have the capability to allow objects to be distributed amongst the cluster using bidding, randomly, using capacity of nodes, or using other information. Accordingly, the present invention uses a combination of a page mapping table and a hash-to-UID table in order to detect and eliminate duplicates digital objects.

A hash-to-UID table is distributed among any number of nodes within the cluster (preferably over all nodes), and a given table on a node represents a range of possible hash values and stores pairs of hash values and unique identifiers (or partial values and identifiers) for objects within the cluster. A page mapping table maps a particular page range of a hash value of a digital object to an individual node, and, this node will hold the corresponding hash-to-UID table. Thus, a page mapping table in RAM on a node points to any number of hash-to-UID tables also in RAM, each hash-to-UID table actually holding the records indicating the pairs of hash values and unique identifiers for digital objects stored within the cluster. In this fashion, if nodes are deleted or added, only pointers in RAM need be moved around, not entire files on disk. The page mapping table may be the same exact page mapping table 210 described earlier, or may be a similar table. The hash-to-UID tables stored on each node are analogous to the pages indexes described above in that the page mapping table identifies the location of a particular hash-to-UID table, and each hash-to-UID table on a node is responsible for a particular range of hash values.

Figure 4:
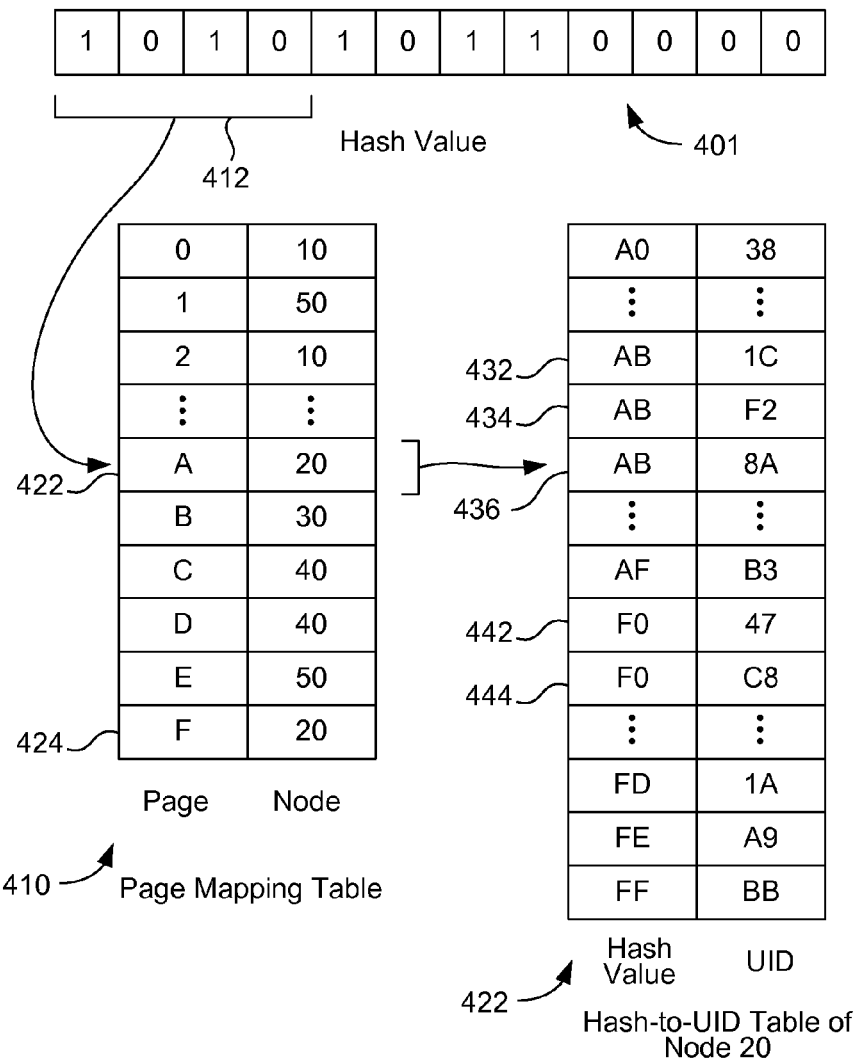
FIG. 4 illustrates a more detailed example of detecting duplicates.

FIG. 4 illustrates a more detailed example of detecting a duplicate object using the page mapping table 410 and a hash-to-UID table 422. In this example, a hash value 401 and a unique identifier for a digital object has been obtained in order to determine whether a duplicate exists. Although in this example the hash value has only 12 bits, a hash value may have as many as 128 bits or more. In this example, the first four bits 412 of the hash value are used to divide up the potential address space addressed by the 12-bit hash value into 16 different address ranges, or pages. In other words, the first four bits represent a possible number from 0 up to 15, or from 0-9 and A-F in hexadecimal. Each of these hexadecimal digits then represents a possible page of addresses that will be used as key into the page mapping table 410. Of course, fewer or greater than four bits of the hash value may be used as an index into the page mapping table, fewer bits resulting in a much shorter table, while a greater number of bits resulting in an exponentially larger table. Because RAM is relatively inexpensive, a greater number of bits for key 412 is likely to be used, with 8 to 16 bits being a reasonable number.

As shown, the page mapping table 410 includes a first column, page, listing each hexadecimal digit that could possibly be identified by the four bits at 412. The second column of the page mapping table lists the particular node holding the hash-to-UID table indicating objects present within the cluster. Note that it is possible for more than one page to be stored on a particular node. For example, rows 422 and 424 indicate that node 20 has a hash-to-UID table representing digital objects within the cluster whose hash values begin with A and with F. Even though the second column lists all nodes of the example cluster 120, it is not required that each node keep a hash-to-UID table, although that is preferable.

As shown, hash-to-UID table 422 has a first column listing the hash values of digital objects that begin with either A or F, and a second column listing the corresponding unique identifier for those objects. These entries may be placed into the table as objects are written to the cluster, when they are moved by the health processing module, during a fast volume recovery (FVR, after failure of a volume), or during a volume retire procedure.

The contents of these columns may be varied depending upon implementation details. For example, it is possible that the first column will list the entire hash value (i.e., the entire 12 bits of this example, or the entire 128 bits in the preferred embodiment) rather than a partial hash value as shown. Also, it is possible that the second column will list the entire unique identifier (e.g., 128 bits); in this example, only the first 8 bits are listed. Listing the entire hash value or the entire unique identifier will greatly increase the size of the table, while listing a portion (e.g., the first 48 bits, or the first 8 bits in this example) will result in a smaller index at the expense of uncertainty regarding the digital object. Hash value 401 has the hexadecimal value AB0, and rows 432-436 indicate that digital objects within the cluster whose hash values begin with the digits AB have corresponding unique identifiers 1C, F2 and 8A.

In this example, rows 432-436 have the same first column because it is possible that a single digital object has been stored three times within the cluster and has been provided with three different unique identifiers. It is possible that three copies are present because of an object metadata requirement that three copies be kept. Or, it is possible that there is a requirement for two copies and that the third copy is unneeded.

It is also possible that rows 432-436 represent three different digital objects. It is possible that there are three digital objects having hash values AB0, AB4 and ABE, and that these digital objects have the corresponding unique identifier as shown. Accordingly, rows 432-436 correctly indicate that digital objects having hash values beginning with "AB" are stored within the cluster. This situation illustrates the uncertainty that is possible when partial hash values are used in the first column. When searching for duplicates in this situation, it may be necessary to check each digital object. Even though there is some uncertainty in this embodiment when partial hash values are used, the size of the hash-to-UID table can be kept manageable. In a preferred embodiment, partial hash values are used in the first column and a suitable length for these partial hash values is 32 to 48 bits. Partial unique identifiers may also be used in the second column and a suitable length for these identifiers is 32 to 48 bits.

Row 442 of the table also shows another implementation detail. Assume that row 442 is added when an object having hash value F05 is written to the cluster. Row 444 is added when that exact same object is also written to the cluster. Each copy will have a different unique identifier perhaps because random numbers are used or because a different hash function is used for the unique identifier. In this manner, it is not necessary for any node to scan its hash-to-UID table when writing a new object and adding a new row. The new row is simply added without regard as to whether a duplicate digital object already exists. In this embodiment, duplicates are not detected before a write is performed.

Similar to the pages indexes described above, the hash-to-UID tables may be distributed throughout the cluster.

Detection of Duplicate Digital Objects

Figure 5:
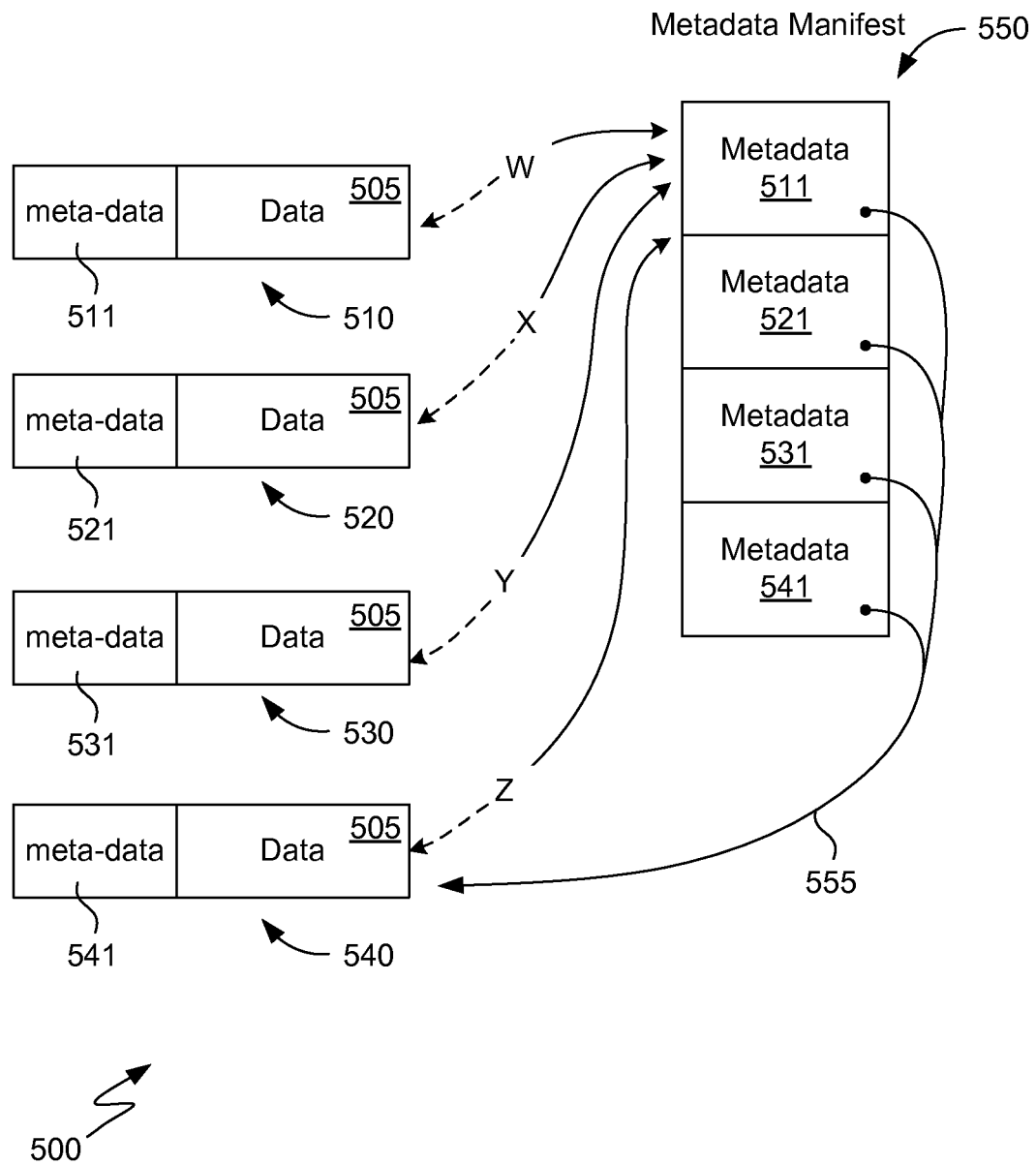
FIG. 5 illustrates how duplicates are deleted.

FIG. 5 illustrates an example 500 of duplicate digital objects that will be used in the detailed explanation of detection and elimination of duplicate digital objects. Example 500 illustrates conceptually how duplicate digital objects are condensed into a single digital object. Shown are any number of digital data streams 510, 520, 530 and 540 that each include the exact same data 505. Data 505 represents information that is prone to duplication within a storage cluster such as an e-mail message, an e-mail attachment, a music file, etc. Each data stream, though, will have a different metadata section 511, 521, 531 or 541 because each stream was written at a different time, might have originated from a different client application, might have been given a different file name, etc. Accordingly, it can be useful to retain each of these metadata sections even though the duplicates of the data sections 505 may be eliminated.

Initially, each data stream has a unique identifier W, X, Y or Z that respectively identifies each of these data streams on disk (represented by the dashed lines). As duplicates are detected and eliminated, a metadata manifest 550 will be created and built up using each of the metadata sections. For example, if duplicate objects W, X, Y and Z are detected at a particular point in time, then the manifest 550 is created to contain each of their metadata sections and an additional pointer 555 is added to each section (or a single pointer is added to the manifest as a whole) to point back at a single one of the data streams, in this case, stream 540. At this point, the disk index in RAM may be modified so that the unique identifiers W, X, Y and Z now point to metadata manifest 550 (indicated by the solid lines) instead of to their former digital streams (indicated by the dashed lines). At this point, digital streams 510, 520 and 530 may be safely deleted, yet all information is retained as a client application seeking the digital object identified by unique identifiers W, X, Y and Z will still be able to access not only data 505 but also the original metadata. Preferably, pointer 555 points to one of the original data streams (in this case stream 540), although a completely new data stream can be created that holds data 505.

When streams 510, 520, 530 and 540 are stored on the same node, adjusting the memory index for unique identifiers W, X, Y and Z is straightforward as the memory index is on a single node and all the objects are present on volumes of that node. When digital objects are spread amongst the cluster on different nodes a modification is used. It is possible to build up the metadata manifest and save it on a particular disk of a node (e.g., the node having stream 540). Then, streams 510-530 may be read from their respective nodes and essentially moved to the node having the manifest (moving the pointers, not the data). Identifiers W, X and Y may then be pointed to the manifest 550 by adjusting the disk index in RAM of the new node. Streams 510-530 may then be deleted.

A distinction is made between a duplicate of an object, which is unnecessary and should be deleted, and a replica (or replicas) of an object which the cluster purposefully creates for data redundancy. Typically, duplicates will be stored by the cluster unknowingly because client applications will store these duplicates as needed (usually without realizing an original is already present in the cluster). The cluster is then unaware of the duplicates because typically the unique identifier will be a random number, and all duplicates will have different unique identifiers, even though their data will be the same. By contrast, a replica of an object is created by the cluster, is known by the cluster, and will have the same unique identifier as the original object. The present invention will detect and eliminate duplicate objects, not eliminate replicas of objects. Concerning the case where a cluster uses a hash of the object data as the unique identifier for the object, any duplicate added to the cluster will appear to be a valid replica because its unique identifier will be the same for all objects. In this situation, the normal health processing will trim any unnecessary replicas above the minimum needed. In the embodiment described, removal of duplicate objects and the replication of objects to the required count are independent processes.

Figure 6A:
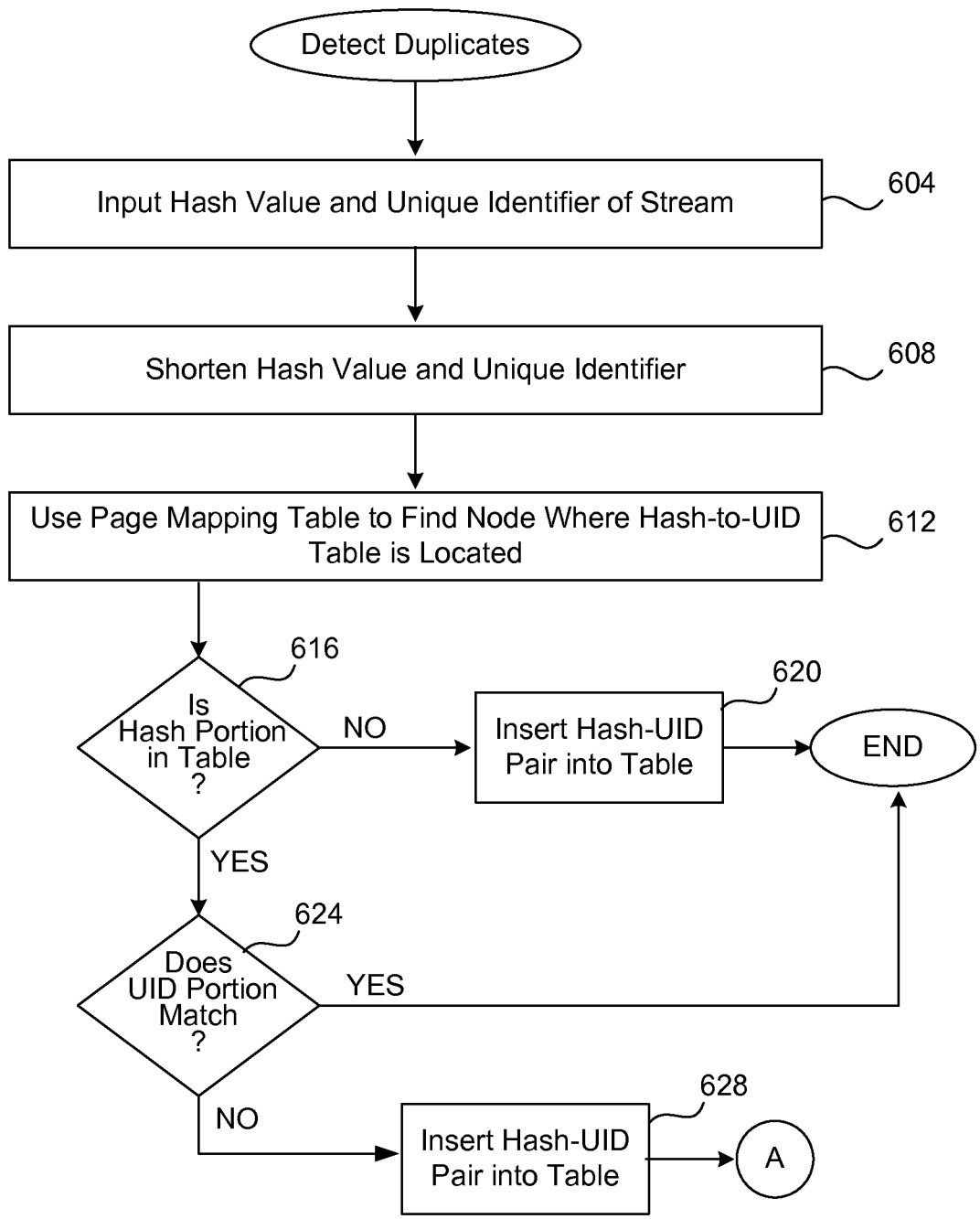
FIGS. 6A and 6B is a flow diagram describing one embodiment by which duplicates of a digital object are detected.
Figure 6B:
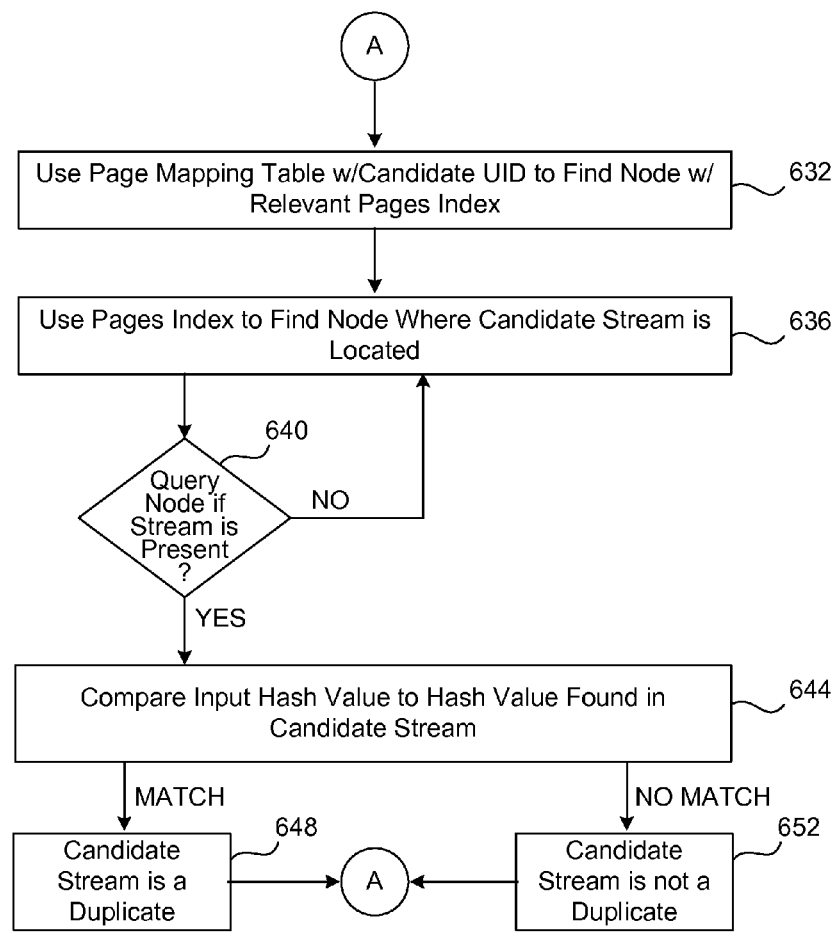

FIGS. 6A and 6B are a flow diagram describing one embodiment by which duplicates are detected within a storage cluster. Given a particular digital stream with a data portion, the purpose of the diagram is to determine whether there already exists within the cluster another digital stream having the same data portion. In step 604 a hash value and a unique identifier corresponding to a particular digital stream within the cluster is input. The hash value is the value of a hash function applied to the actual data of the stream (e.g., data 505, such as a PDF file, an e-mail message), while the unique identifier identifies the entire digital stream (e.g., stream 510). A unique identifier generated using a random number will be unique for all objects in the cluster. If a hash function is used to generate the unique identifier for the object, it will also be unique as long as it is applied over the data of the object and its metadata (as the metadata typically includes object-specific information such as a timestamp, client application data, etc.) A hash function applied just to the object's data will provide the same value for identical objects. Accordingly, a technique that produces different unique identifiers for duplicate objects is preferred as the duplicates can then be distinguished from cluster-generated replicas.

The inputs may come from a variety of sources. For instance, the stream may be captured when written to the cluster, or when another operation upon the stream such as read or delete is performed. Or, a client application may specifically provide the stream (or the hash value and unique identifier) in order to determine if duplicates exist. In another embodiment, a process of the cluster on each node iterates over all digital objects on a regular basis looking for duplicates; the hash value and unique identifier may then be retrieved from each digital stream or from its metadata section. In any of these cases, the pairs of hash values and unique identifiers may be placed into a queue in RAM and processed as time permits. As mentioned earlier, the unique identifier may be a random number for each stream, a hash value of the data or of the stream, or may be generated in some other fashion.

In step 608 a portion of the hash value and a portion of the unique identifier are identified for use in determining if duplicates exist. Use of portions that are shorter than the full length allows for the page mapping table and hash-to-UID tables to be more manageable in size and reduces the RAM required, although introduces some uncertainty as will be explained below. Portions of 4 bytes each may be used, while a greater number of bits may be used in larger clusters. The example of FIG. 4 uses a 1 byte portion of each of the hash value and the unique identifier in the hash-to-UID table.

In step 612 the page mapping table 410 is used to identify the particular node where the hash-to-UID table corresponding to the hash value is located. In this example, key 412 has a 4-bit length and is used as an index to select row 422 identifying node 20 as storing the hash-to-UID table representing objects whose hash value begin with the digit "A." Unlike the pages index 222 that identifies where objects are stored, table 422 lists pairs of partial hash values and partial unique identifiers within the cluster to help in the detection of duplicates.

Step 616 detects whether the hash portion of the entire hash value is present in the table. If not, this indicates that the input stream has not been seen before; if it has been (or will be) written to the cluster then in step 620 the portions of the hash value and unique identifier pair are written as a row in the table. Writing a row in the table for this particular stream indicates that the stream is now present within the cluster and this row may be used in the future to detect if there are other duplicates within the cluster. On the other hand, if the hash portion (e.g., "AB") is present in the table at a particular row (e.g., row 432), then this indicates that there is at least one possible candidate stream for a duplicate present within the cluster.

Accordingly, step 624 checks whether the candidate UID portion in the second column of the table of the particular row matches with the UID portion input in step 604. For example, if value AB in row 432 matches with the hash portion determined in step 608, then step 624 determines whether the value 1C matches with the input UID portion determined in step 608. If so, this indicates that it is likely that the stream input in step 604 has already been input to the cluster (perhaps a replica) and has already been recorded in the table; thus, no further action is needed and the flow ends. While there is a very slight probability that this row actually identifies a different digital stream (because of the uncertainty introduced by partial values) there is no harm in assuming that this stream is already present. On the other hand, if the UID portion does not match, this indicates that a duplicate has very likely been found because a digital stream has earlier been recorded in the table that has the same portion of a hash value as the input stream but a different unique identifier. Therefore, in step 628 a new row is added to the table by inserting the portions of the hash value and UID pair from step 604 into table 422. For example, if row 432 matches the hash portion of the input stream but not the UID portion, then a new row 434 may be added where the value F2 is a portion of the UID for the input stream. It is very likely that a duplicate has been found but not a certainty because only the portions of the hash value has been compared up to this point. Note that steps 616 and 624 may identify multiple rows (e.g., rows 432-436) as representing possible duplicate streams within the cluster.

Because of the use of portions of the hash values instead of the entire hash values, it can be useful to take further steps to determine with certainty if a duplicate or duplicates exist. Accordingly, the full hash value 401 of the input stream can be compared with the full hash value of each candidate duplicate. Steps 632-652 may be repeated for each candidate stream identified in step 624.

In order to compare the entire hash value 401 of the data in question with the full hash value of the data contained in one of the candidate streams, the streams should first be located within the cluster and retrieved. In the simple example shown, rows 432-436 indicate three candidate streams whose unique identifiers are 1C, F2 and 8A. A variety of techniques may be used to retrieve these candidate streams from within the cluster, and these techniques may vary depending upon whether the unique identifiers in the second column of the hash-to-UID tables are full identifiers or partial identifiers.

In a preferred embodiment, the page mapping table 210 and the pages indexes (e.g., pages index 222) are used to locate these candidate streams within the cluster. In step 632 the candidate unique identifier or a portion of it (e.g., unique identifier F2 from row 434) is used as a key 312 as demonstrated in FIG. 3 in order to find the node which has the relevant pages index. In this example, this candidate unique identifier identifies node 20 as storing the relevant pages index 222. In step 636 the candidate unique identifier (or portion of it) is used in this pages index to determine the likely node where the candidate stream may be found. If a partial candidate unique identifier is used, then more than one candidate node may be identified. In step 640 this candidate node is queried as to whether it holds a stream identified by the candidate unique identifier. If not, then step 636 is used to identify any other nodes that might be candidate nodes. Once all candidate nodes have been checked and the candidate stream is not identified on any of the nodes, then control moves to step 652 and an indication is made that no duplicate has been found within the cluster.

If the candidate unique identifier is a portion of the complete unique identifier (e.g., 4 bytes instead of 16 bytes), then a candidate node may still be queried as to whether it includes a digital stream identified by the partial unique identifier In one embodiment, a candidate stream is returned based upon the partial unique identifier (even though it might not be a duplicate) and then the hash values may be compared. A match indicates a duplicate. No match indicates no duplicate, and non-matches are likely to be relatively few as even a partial unique identifier will be somewhat unique. Increasing the size of the partial unique identifier reduces the chances of non-matches.

If, in step 640 a candidate node indicates that "yes," it contains a candidate stream identified by the candidate unique identifier, then in step 644 the full hash value of this candidate stream is compared to the input full hash value 401. In one embodiment, the candidate stream is retrieved and its metadata is accessed in order to extract the hash value of the data (e.g., an e-mail attachment) contained within the stream. Alternatively, the hash value of the data contained within the candidate stream may be calculated on-the-fly. If the two hash values match, then step 648 indicates that the candidate stream first identified in table 422 (e.g., represented by row 434) is in fact a duplicate and a suitable alert, output, message or notation is made. Control may then return to step 632 to process any other candidate unique identifiers found in table 422 (e.g., rows 432 and 436) that might indicate that other duplicates are present within the cluster. On the other hand, if the two hash values do not match, then step 652 indicates that the candidate stream is not a duplicate and control may also return to step 632.

In another embodiment, a multicast technique may be used to query each node if it contains a digital stream having one of these unique identifiers. If full unique identifiers are used in the second column of table 422 then each node having the requested stream would return it so that the hash value of the candidate stream may be compared against the entire hash value 401. If partial unique identifiers are used in the second column, then the multicast technique may use these partial unique identifiers by returning likely digital streams, and then comparing hash values.

Elimination of Duplicate Digital Objects

Once duplicate digital streams are identified in step 648 then it may be useful to eliminate one or more of these streams from the cluster. In one embodiment, of all streams found whose data is exactly the same, only one copy may be retained. Alternatively, two or more copies may be retained and the other unneeded duplicates may be eliminated depending upon the policy for each stream or the policy of the cluster.

Figure 7:
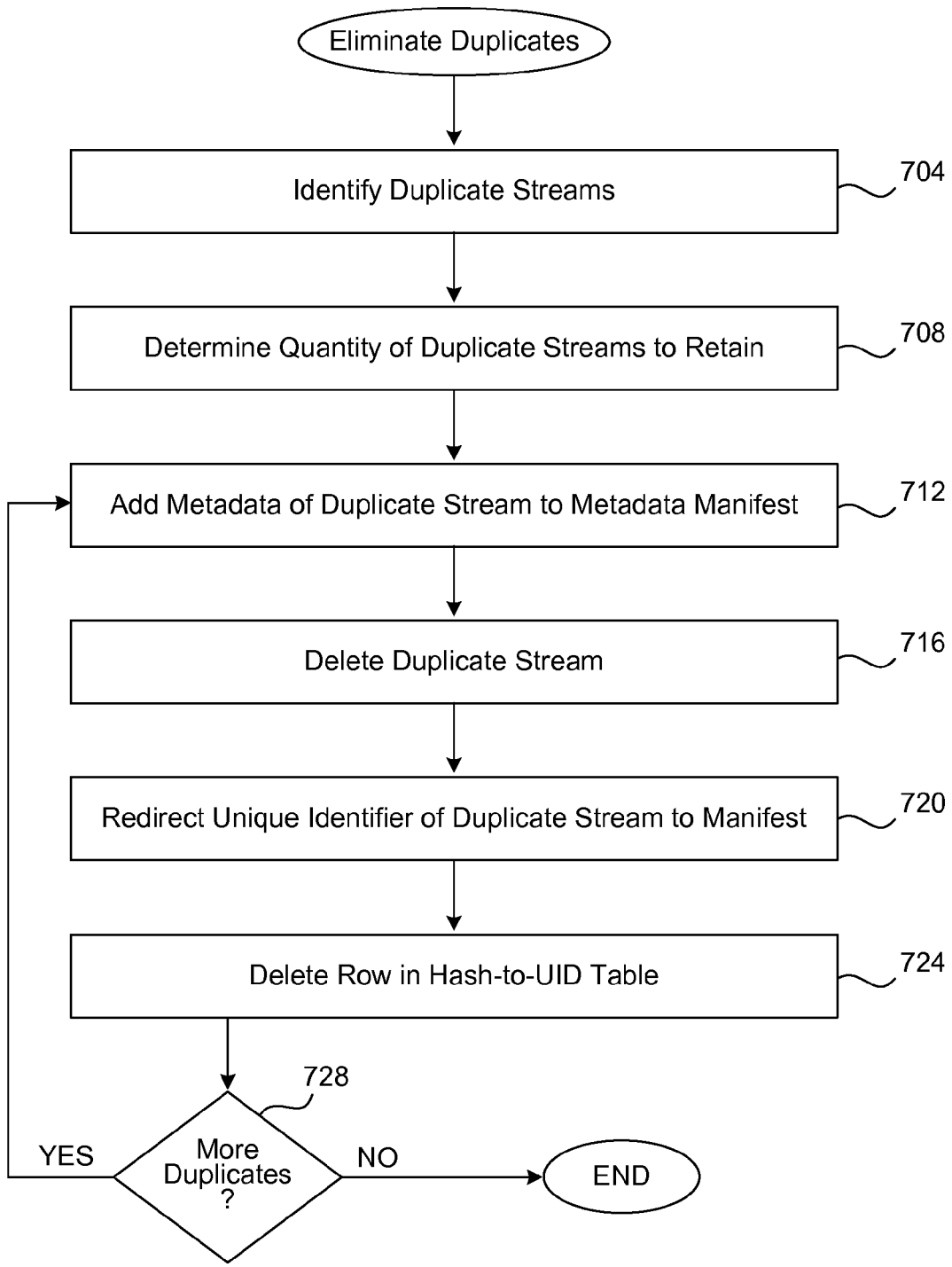
FIG. 7 is a flow diagram describing one embodiment by which duplicates of a digital object are deleted.

FIG. 7 is a flow diagram describing one embodiment by which duplicate digital streams may be eliminated. Reference will be made to the example of FIG. 5 in which four duplicates have been found within the cluster and only one will be retained.

In step 704 duplicate streams within the cluster are identified. In a preferred embodiment, the streams are identified as described above with reference to FIGS. 6A and 6B. These duplicate streams may include an input stream which has just been written to the cluster and whose writing has triggered the detection of duplicates. When each stream is identified, a unique identifier for each stream is also identified. FIG. 5 shows four duplicate streams 510, 520, 530 and 540 each having identical data sections 505, yet having different metadata sections. It is possible that these streams will exist on different nodes as described above.

In step 708 it is determined which stream to retain. It is an implementation detail to decide which particular stream to retain; in this example, it is determined to retain stream 540 with unique identifier Z. In addition, the metadata manifest 550 is created on disk and the metadata 541 of the stream to be retained is placed into the manifest. Since stream 540 will be retained, it is not strictly necessary to place a copy of metadata 541 into the manifest, but doing so keeps the manifest consistent. The unique identifier Z for the stream to be retained will also be redirected to point at the manifest. A pointer in association with the manifest is added to point to the remaining stream; in this case, pointer 555 references the remaining stream 540. Pointer 555 may be a separate pointer included with each metadata section of the manifest, or the manifest may have a single pointer 555. Preferably, the manifest is created on the same node as the stream 540 to be retained.

In step 712 the metadata of a duplicate stream to be deleted is added to the metadata manifest 550. The first time through this loop, step 712 adds metadata 531 to the manifest as stream 530 will be the first duplicate stream to be deleted.

Next, in step 716 the duplicate stream 530 may be deleted as its metadata has been retained in the manifest. Stream 530 may be deleted in a variety of manners. For example, a call may be made to a system function that deletes a stream given its unique identifier. The disk space occupied by stream 530 may be freed up, may be overwritten, or the stream may effectively be deleted simply by redirecting unique identifier Y.

In step 720 the unique identifier for the duplicate stream to be deleted will be redirected to point to the metadata manifest rather than to its original stream. For example, as stream 530 will be the first to be deleted, its unique identifier Y will be redirected to point at metadata manifest 550. If the manifest is on a different node than the stream 530, then the cluster effectively moves the stream from its original node to the node with the manifest by deleting the stream from its original node and recording identifier Y as pointing to the manifest in the RAM index and in the disk journal.

Any future application that desires the data identified by unique identifier Y will be directed to manifest 550 (where metadata 531 is available), and may then follow pointer 555 to obtain the data 505.

Step 728 checks whether more duplicate streams are remaining to be deleted. If so, then control moves to step 712. For example, streams 520 and 510 may have their metadata moved, be deleted and have their unique identifiers be redirected as explained above.

Computer System Embodiment

Figure 10A:
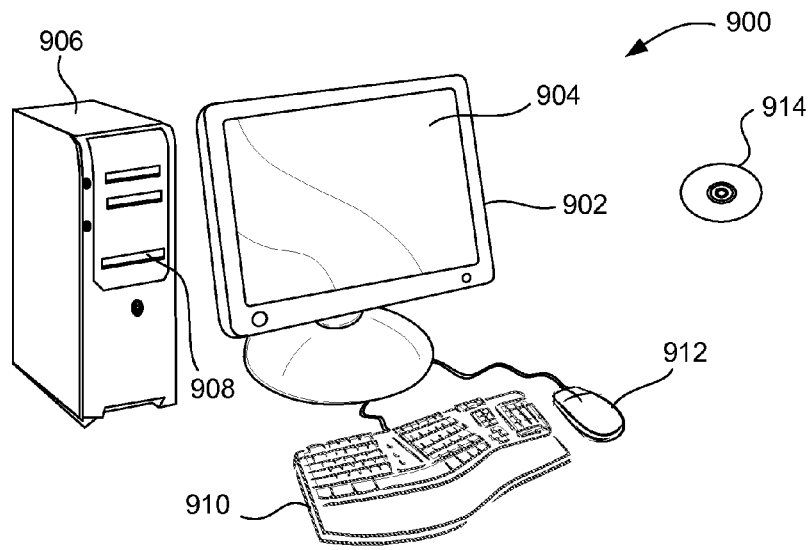
FIGS. 10A and 10B illustrate a computer system suitable for implementing embodiments of the present invention.
Figure 10B:
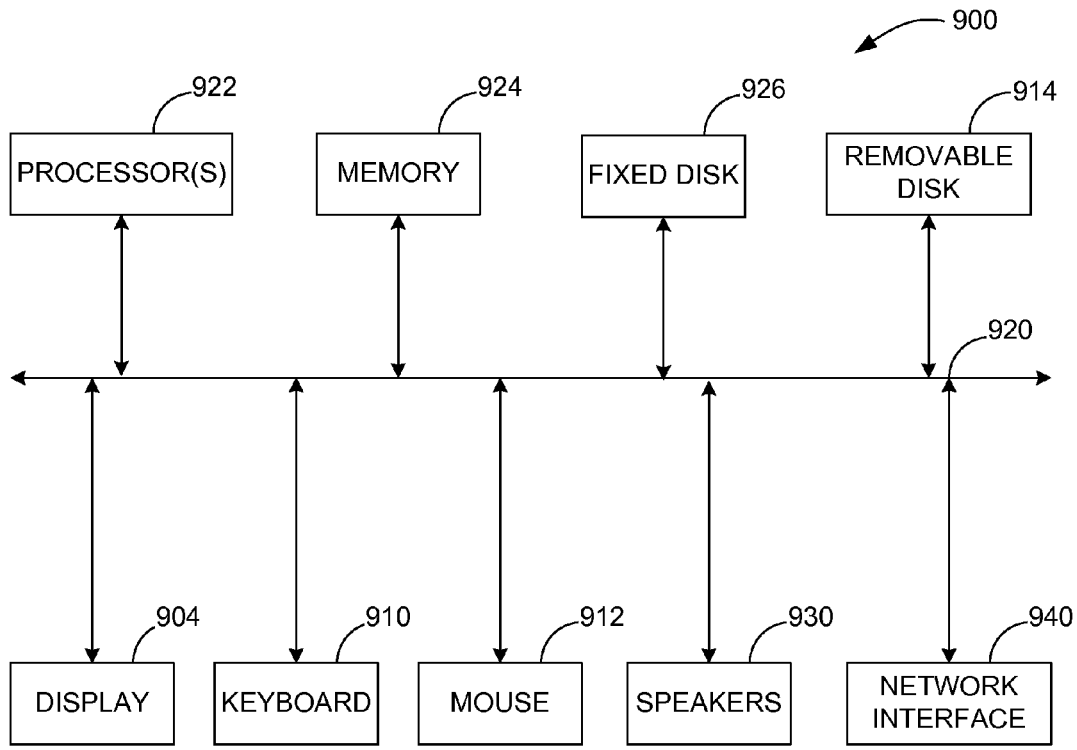

FIGS. 10A and 10B illustrate a computer system 900 suitable for implementing embodiments of the present invention. FIG. 10A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of detecting duplicates of a first digital object within a storage cluster, said method comprising:
   receiving, within said storage cluster, a hash value of said first digital object and a unique identifier associated with said first digital object, said hash value falling within an address space made up of a plurality of non-overlapping ranges;
   identifying a portion of said hash value whose value represents a first range of addresses within said address space;
   accessing a page mapping table using said value indicated by said portion of said hash value to identify a computer node of said storage cluster, said page mapping table mapping each range of addresses of said address space to one of said computer nodes;
   accessing a hash table of said computer node to determine whether said hash value and said unique identifier are represented in said hash table;
   accessing a second digital object within said storage cluster when it is determined that said hash value is represented in an entry in said hash table but said unique identifier is not; and
   comparing a hash value stored in association with said second digital object with said received hash value and determining that said second digital object is a duplicate of said first digital object when said hash values match.

2. A method as recited in claim 1 further comprising:
   identifying a second unique identifier of said entry; and
   accessing said second digital object using said second unique identifier.

3. A method as recited in claim 1 further comprising:
   accessing said hash table using a first part of said hash value to determine whether said hash value is represented in said entry.

4. A method as recited in claim 1 further comprising:
   determining that said hash value is represented by multiple entries in said hash table; and
   for each of said multiple entries, accessing a digital object within said storage cluster having a unique identifier corresponding to each of said entries.

5. A method as recited in claim 1 further comprising:
   identifying a second unique identifier of said entry; and
   accessing said page mapping table using a portion of said second unique identifier to identify a computer node of said storage cluster having an index indicating the location of said second digital object within said storage cluster.

6. A method as recited in claim 1 further comprising:
   identifying a second unique identifier of said entry; and
   broadcasting a message to all computer nodes of said storage cluster to find said second digital object identified by said second unique identifier.

7. A method of storing a digital object in a storage cluster, said method comprising:
   receiving said digital object at a first computer node within said storage cluster having a plurality of computer nodes;
   calculating a hash value for said digital object that falls within an address space and storing said digital object on a disk of said first computer node, said address space made up of a plurality of non-overlapping ranges;
   generating a unique identifier for said digital object;
   identifying a portion of said hash value whose value represents a first range of addresses within said address space;
   accessing a page mapping table using said value indicated by said portion of said hash value to identify a second computer node, said page mapping table mapping each range of addresses of said address space to one of said computer nodes;
   sending said hash value and said unique identifier to said second computer node; and
   storing at least a first part of said hash value and at least a first part of said unique identifier in a table on said second computer node to indicate that said digital object is present within said storage cluster.

8. A method as recited in claim 7 wherein for every digital object stored within said cluster having a hash value falling within said first range of addresses, said table stores a record indicating that said every digital object is stored within said cluster.

9. A method as recited in claim 7 wherein said storage cluster is a write-once read-many (WORM) fixed-content stored cluster.

10. A method as recited in claim 7 wherein said table maps said first part of said hash value to a plurality of unique identifiers.

11. A method as recited in claim 7 wherein said page mapping table and said table are located in RAM.

12. A method as recited in claim 7 wherein said unique identifier is generated using a hash function or by a random number generator.

13. A method as recited in claim 7 wherein said digital object has associated metadata indicating that said digital object is likely unique and that searching for duplicates of said digital object is unnecessary.

* * * * *